(12) United States Patent
Stallings et al.

(10) Patent No.: US 8,793,615 B2
(45) Date of Patent: Jul. 29, 2014

(54) INTERACTIVE PROFILE CARDS FOR MOBILE DEVICE

(75) Inventors: Heath Stallings, Colleyville, TX (US); Brian F. Roberts, Dallas, TX (US); Donald H. Relyea, Jr., Dallas, TX (US); Daniel Spurgeon Dunnam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 937 days.

(21) Appl. No.: 12/341,479

(22) Filed: Dec. 22, 2008

(65) Prior Publication Data

US 2010/0162167 A1     Jun. 24, 2010

(51) Int. Cl.
*G06F 3/048*     (2013.01)

(52) U.S. Cl.
USPC ........................................... 715/811

(58) Field of Classification Search
USPC ........................................... 715/811
See application file for complete search history.

(56) References Cited

U.S. PATENT DOCUMENTS

| | | | |
|---|---|---|---|
| 7,509,349 B2* | 3/2009 | Celik | 1/1 |
| 7,933,587 B1* | 4/2011 | Swan | 455/412.1 |
| 2006/0058063 A1* | 3/2006 | Bocking et al. | 455/556.2 |
| 2006/0123360 A1* | 6/2006 | Anwar et al. | 715/810 |
| 2007/0010264 A1* | 1/2007 | Sun et al. | 455/466 |
| 2007/0047519 A1* | 3/2007 | Bangor et al. | 370/352 |
| 2007/0206736 A1* | 9/2007 | Sprigg et al. | 379/88.21 |
| 2007/0293206 A1* | 12/2007 | Lund | 455/415 |
| 2008/0220752 A1* | 9/2008 | Forstall et al. | 455/415 |
| 2009/0100378 A1* | 4/2009 | Klassen et al. | 715/821 |
| 2009/0143052 A1* | 6/2009 | Bates et al. | 455/414.2 |
| 2009/0150488 A1* | 6/2009 | Martin-Cocher et al. | 709/204 |
| 2009/0150574 A1* | 6/2009 | Kawahara et al. | 710/18 |
| 2010/0144318 A1* | 6/2010 | Cable | 455/412.1 |

* cited by examiner

*Primary Examiner* — Omar Abdul-Ali
*Assistant Examiner* — Anil Bhargava (57) ABSTRACT

A device receives a request to display an interactive profile card for a particular contact and retrieves contact-related items for the particular contact. The device also retrieves a template for the interactive profile card and generates a graphic representing a contact-related item. The device displays the template with the graphic and executes a peripheral application to present the contact-related item when the graphic is selected by a user of the computing device.

21 Claims, 10 Drawing Sheets

INTERACTIVE PROFILE CARDS FOR MOBILE DEVICE

BACKGROUND

Mobile devices (e.g., cell phones, personal digital assistants (PDAs), etc.) are being configured to provide users with an increasing variety of applications and communication options. For example, a mobile device may send and receive telephone calls, emails, instant messages (IMs), etc. Also, a mobile device may display images, play music and videos, display web pages, and generate reminders based on a calendar or task list. Communications with a single contact (e.g., person) may come in multiple forms and require different applications to review information associated with that contact.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide an interactive profile card for a display on a mobile device. The interactive profile card may provide access to applications and/or information that is associated with a particular contact. Contact-related items may be compiled and associated with a profile card for the particular contact. Thus, the interactive profile card provides a contact-focused presentation of information in which the application and/or technology type are incidental to a user. In one implementation, the interactive profile card may be displayed during an ongoing telephone communication of a mobile device (e.g., a cell phone, a PDA, a laptop computer, etc.).

The term "contact-related item," as used herein, may refer to any message (e.g., an email or IM), object (e.g., a file), or indication (e.g., a reminder from a calendar) received by a mobile device or generated by a mobile device that can be associated with a particular contact. As used herein, the term "user" is intended to be broadly interpreted to include a mobile communication device or a user of a mobile communication device.

Figure 1:
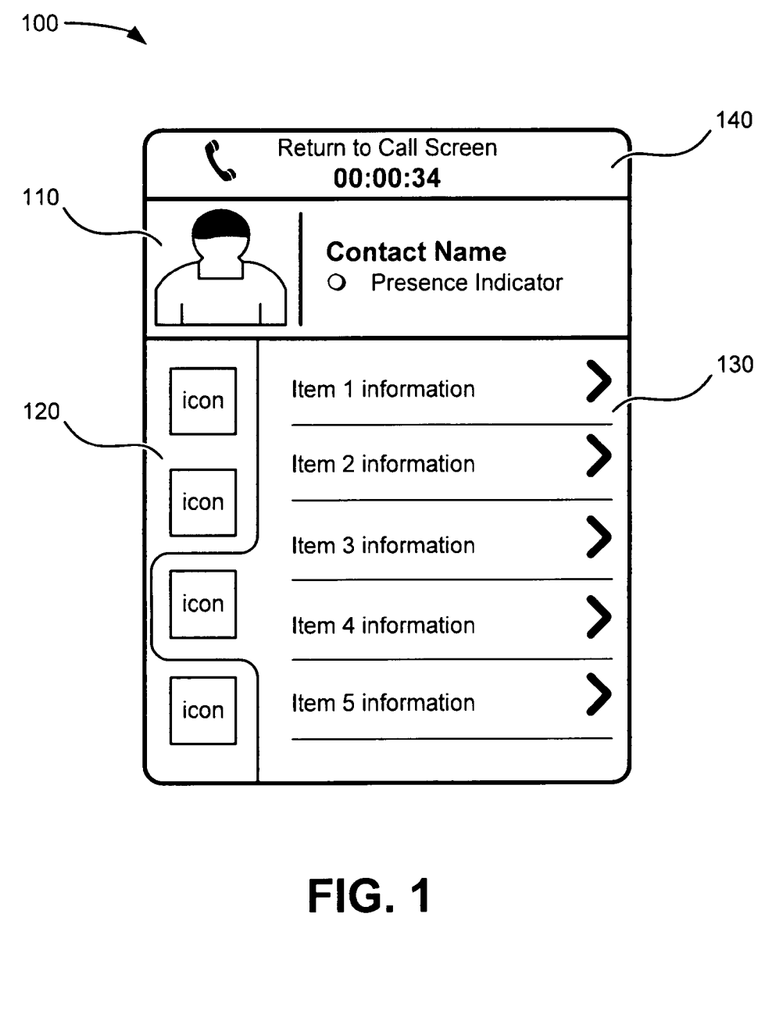
FIG. 1 depicts a diagram illustrating an exemplary implementation of the concepts described herein.

FIG. 1 provides a diagram illustrating an exemplary implementation of an interactive profile card 100. Interactive profile card 100 may include a contact indicator section 110, a contact-related category section 120, a contact-related item section 130, and a navigation section 140. Each of contact indicator section 110, contact-related category section 120, contact-related item section 130, and navigation section 140 may be displayed in one or more windows on a display. A "window," as used herein, is intended to be broadly interpreted to include any display mechanism (e.g., a window, a menu, etc.) capable of being displayed by a display. For example, a window may include an enclosed area on a display screen that may display information and/or may permit execution of an application. The number of windows provided by a display, the types of windows, the types of information provided in windows, the arrangement of windows on the display, etc. may be configured by a user of a mobile device containing the display.

In an exemplary implementation, interactive profile card 100 may be assembled information retrieved from a contact profile that may be maintained by a particular contact. Information for the contact profile may be supplied by the particular content and updated by the particular contact. The contact profile may be configured to restrict or partially restrict access to selected users. The contact profile may be stored, for example, on a service provider's server that may be accessed by multiple users via a network. Thus, information related to a particular contact may be updated by the particular contact and stored on the service provider's server, making the updated information available to be retrieved by any user with access rights to the stored contact profile. Along with the contact profile retrieved from the service provider, interactive profile card 100 may be supplemented with other contact-related information that may be available on a user's mobile device (e.g., communications, task lists, and other information that may be stored on the mobile device or accessible through accounts accessed by the mobile device).

Referring to FIG. 1, contact indicator section 110 may include information to identify a particular contact. Contact indicator section 110 may include, for example, a person's name, a picture related to the contact, presence information for the contact, etc. In one implementation, information for contact indicator section 110 may be retrieved from a contact profile available from a service provider. In another implementation, contact indicator section 110 may use contact information adapted from another peripheral application running on the same device, such as images and/or presence information from an instant messaging (IM) application. Generally, "presence" may be considered a status of the nature of activity of a user (e.g., a device used by a person), such as "available," "online and busy," "offline," etc. Presence data may be gathered from a variety of sources including, for example, current activity by a user, schedule information (e.g., calendar or task list), specific indications from a user, a separate presence and availability management (PAM) system, and/or other sources.

Contact-related category section 120 may provide links to groups of similar information and/or applications related to the contact of contact indicator section 110. For example, contact-related categories may include text-based communications from or to the contact, images related to the contact, web-sites, etc. Alternatively, categories 120 may correspond to applications that may required to access information related to the contact. For example, applications may include an email application, an IM application, an image viewing application, a multimedia application, a calendar application, etc.

Contact-related item section 130 may include particular items within each contact-related category of contact-related category section 120. Contact-related items may include items included in a contact profile managed by the particular contact and/or items associated with user applications. In one implementation, particular items may be included as a list of items with some descriptive information about each item. For example, thumbnails and titles of images associated with the contact may be included for a contact-related category of images. As another example, communications sent to or received from the contact may include one or more of the time application type, title, initial words, etc. associated with a communication. In one implementation, each contact-related item in contact-related item section 130 may include a link to allow a user to view a selected contact-related item.

Navigation section 140 may include information and/or a link to allow a user to navigate to another application within the mobile device. For example, as shown in FIG. 1, navigation section 140 may include the elapsed time of an ongoing call. Navigation section 140 may also include a link to allow the user to return to a previous application screen, such as a call summary screen.

Although FIG. 1 shows exemplary sections of interactive profile card 100, in other implementations, interactive profile card 100 may contain fewer, different, differently arranged, or additional information than depicted in FIG. 1. For example, interactive profile card 100 may include a different number and/or arrangement of sections. Also, interactive profile card 100 may include a different number and/or arrangement of categories in contact-related categories section 120 and a different number and/or arrangement of items within each contact-related item section 130.

Figure 2:
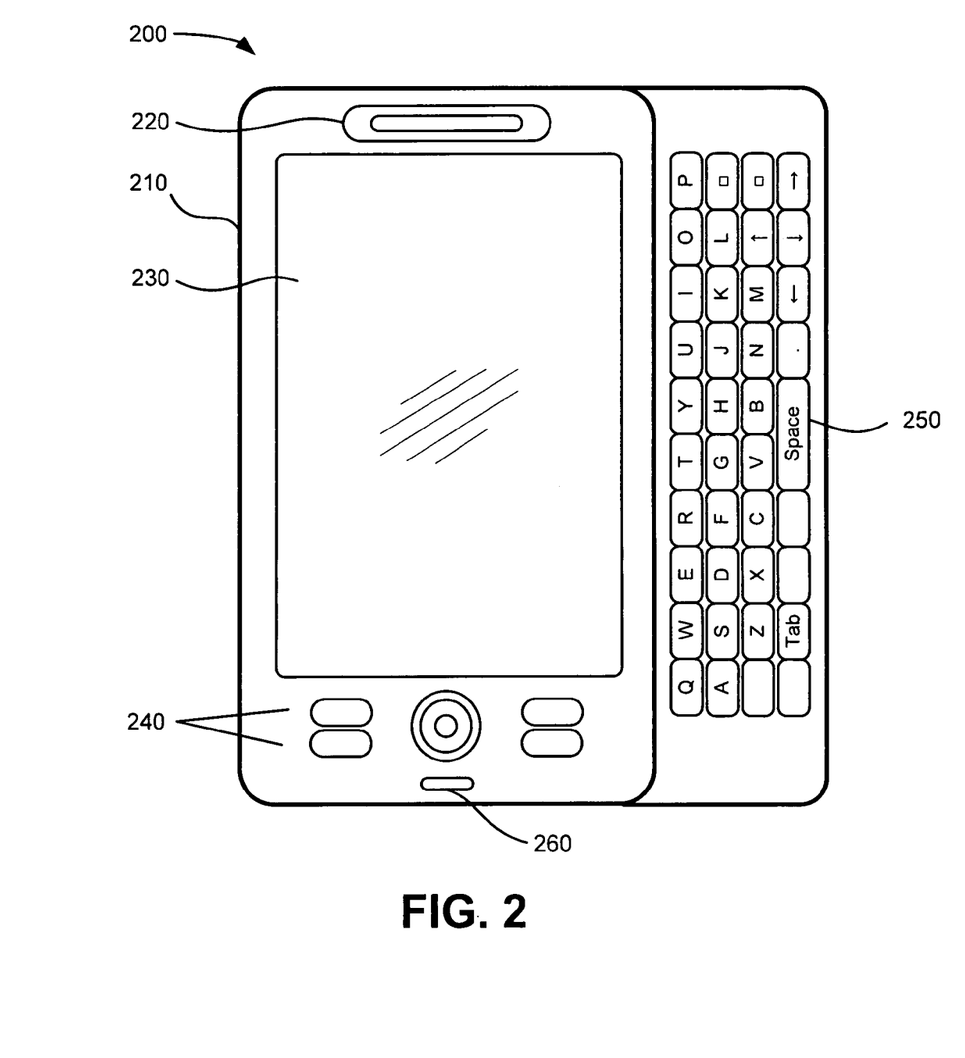
FIG. 2 depicts a diagram of an exemplary device in which systems and/or methods described herein may be implemented.

FIG. 2 is a diagram of an exemplary mobile device 200 (referred to herein as "device 200") in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a personal gaming system, a global positioning system (GPS) unit, or other types of computation or communication devices (e.g., that can receive and/or generate communications), a thread or process running on one of these devices, and/or an object executed by on of these devices.

As illustrated in FIG. 2, device 200 may include a housing 210, a speaker 220, a display 230, control buttons 240, a keypad 250, and/or a microphone 260. Housing 210 may protect the components of device 200 from outside elements. For example, housing 210 may be formed from plastic, metal, or a composite, and may be configured to support speaker 220, display 230, control buttons 240, keypad 250 and/or microphone 260.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Display 230 may provide visual information to the user. For example, display 230 may display text input into device 100, text, images, video, and/or graphics received from another device, and/or information regarding incoming or outgoing calls or text messages, emails, media, games, phone books, address books, the current time, etc. For example, screen 310 may include a liquid crystal display (LCD), such as a thin film transistor (TFT) LCD, etc.

In one implementation, display 230 may include a touch screen display that may be configured to receive a user input when the user touches (or comes in close proximity to) display 230. For example, the user may provide an input to display 230 directly, such as via the user's finger, or via other devices, such as a stylus. User inputs received via display 230 may be processed by components and/or devices operating in device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 230 to be used as an input device. The touch-screen-enabled display 230 may also identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information.

Keypad 250 may include a standard telephone keypad, a QWERTY-like layout (as shown) with a traditional configuration of typewriter or computer keyboard keys, or another keypad layout. In one implementation, keypad 250 may be moveably secured to housing 210 to allow keypad 250 to be concealed when not in use. Keypad 250 may be an optional component.

Microphone 260 may receive audible information from the user. For example, microphone 260 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. In still other implementations, a component of device 200 may perform one or more tasks described as being performed by another component of user device 200.

Figure 3:
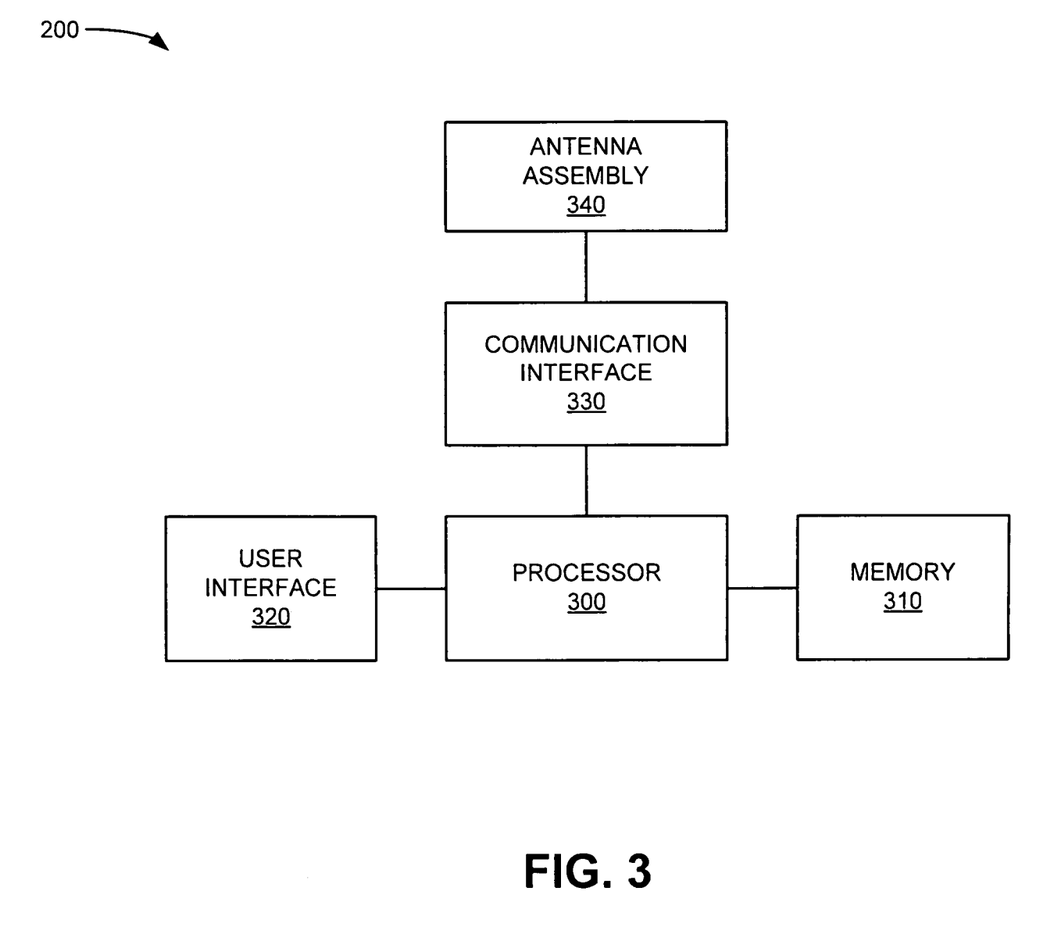
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store data used to display a graphical user interface, such as interactive profile card 100 on display 230.

User interface 320 may include mechanisms for inputting information to device 200 and/or for outputting information from device 200. Examples of input and output mechanisms might include buttons (e.g., control buttons 240, keys of a keypad 250, a joystick, etc.); a speaker (e.g., speaker 220) to receive electrical signals and output audio signals; a microphone (e.g., microphone 260) to receive audio signals and output electrical signals; a display (e.g., display 230) to receive touch input and/or to output visual information (e.g., time-related items received by device 200); a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
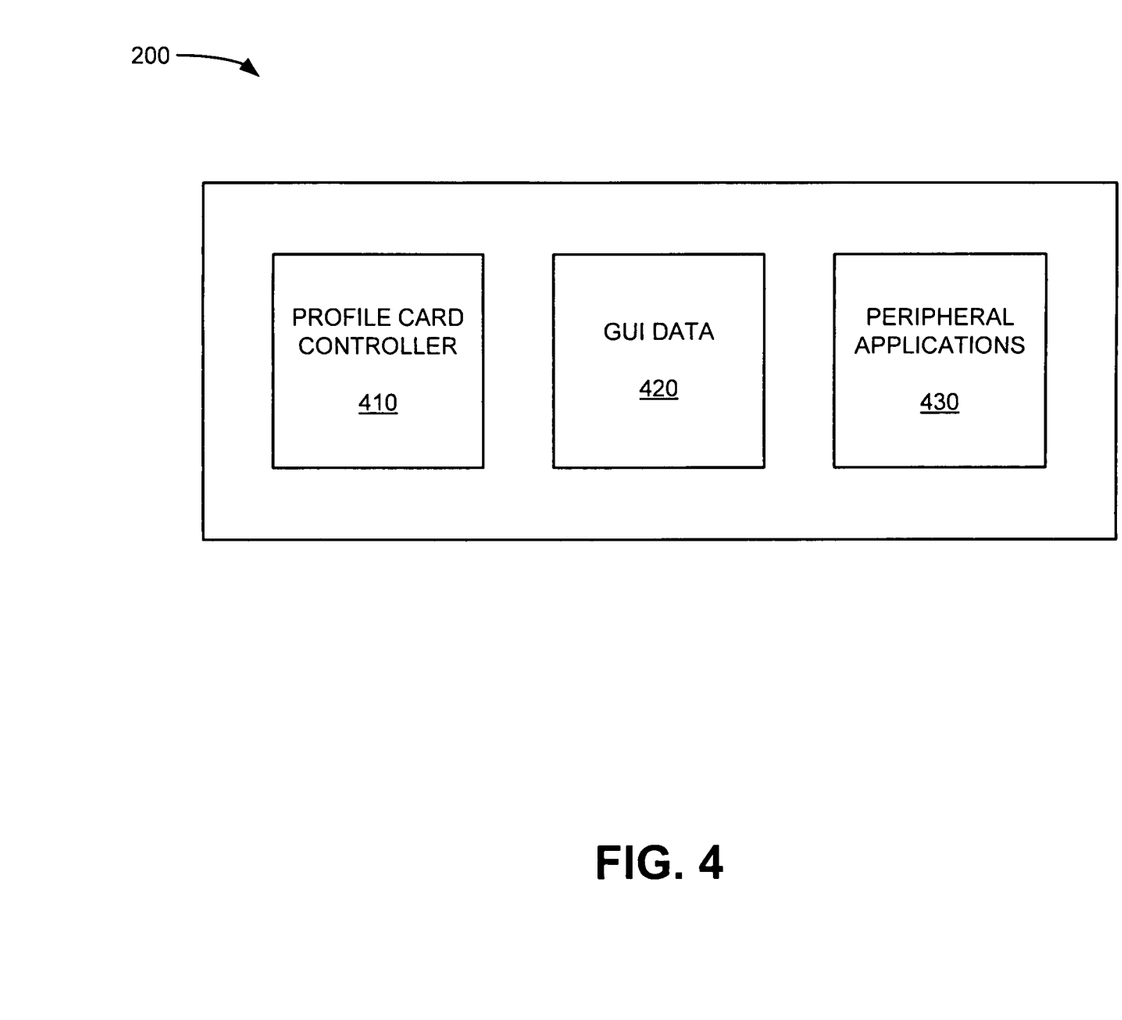
FIG. 4 depicts a diagram of exemplary functional components of the device illustrated in FIG. 2.

FIG. 4 provides a diagram of exemplary functional components of device 200. As shown in FIG. 4, device 200 may include a profile card controller 410 and graphical user interface (GUI) data 420. Device 200 may also include other peripheral applications 430 that provide communication and other services for device 200. In one implementation, functions of profile card controller 410, GUI data 410, and peripheral applications 430 may be implemented by processor 300 in conjunction with memory 310.

Profile card controller 410 may generate and update an interactive profile card (e.g., interactive profile card 100). Based on a request from a user, profile card controller 410 may retrieve (e.g., from a service provider) a contact profile for a particular user. Profile card controller 410 may also receive contact-related items from other applications within device 200, such as peripheral applications 430, and/or from user accounts accessible via device 200. Profile card controller 410 may identify basic information about each contact-related item (e.g., the sender, time received, type of item, etc.) and create a contact-related graphic for each contact-related item based on the basic information. In one implementation, profile card controller 410 may assemble icons and/or graphics based on one or more templates. Templates may include, for example, arrangements for groups of application icons associated with each peripheral application of interactive profile card 100. For example, profile card controller 410 may retrieve, from GUI data 420, an application icon representing a peripheral application, apply stored user preferences, and insert the application icon into a graphic template.

Contact-related items may include, for example, incoming email messages, IMs, short message service (SMS) messages, multimedia messaging service (MMS) messages, telephone call lists, voicemails, calendar items, task lists, images, links to web pages, files received from a particular contact, and the like. Some contact-related items may be identified from the contact profile. Profile card controller 410 may also communicate with applications that receive and/or generate contact-related messages to identify new contact-related messages.

GUI data 420 may include information that may be used by profile card controller 410 to compile graphics for contact-related items. GUI data 420 may include, for example, user preferences, images and/or templates. User preferences may include, for example, format preferences for the interactive profile card arrangement, such as font/icon sizes, contact-related category definitions (e.g., applications associated with each category), and/or contact-related category titles. Images may include, for example, images representing peripheral applications, background images for templates, images related to particular contacts, etc. Templates may include formats for interactive profile card 100 to which particular contact-related information may be supplied for presentation on a display (e.g., display 230).

Peripheral applications 430 may include applications that may receive, generate or manipulate contact-related items. In some implementations, peripheral applications 430 may stored within a memory (e.g., memory 310) of device 200 and/or stored on a remote device that can be accessed over a network. Peripheral applications 430 may communicate with profile card controller 410 to indicate that a message (e.g., a newly received message or a newly-generated message) is available to be displayed for a particular contact on interactive profile card 100. Peripheral applications may include, for example, a telephone application, a text-messaging application, an email application, an instant messaging (IM) application, a web browser, a calendar application, a multimedia messaging service (MMS) application, a short message service (SMS) application, an image viewing application, a camera application, an organizer, a video player, an audio application, a GPS application, a social networking service, other navigation services, etc.

Although FIG. 4 shows exemplary functional components of device 200, in other implementations, device 200 may contain fewer, different, differently arranged, or additional functional components than depicted in FIG. 4. In still other implementations, a functional component of device 200 may perform one or more tasks described as being performed by another functional component of device 200.

Figure 5:
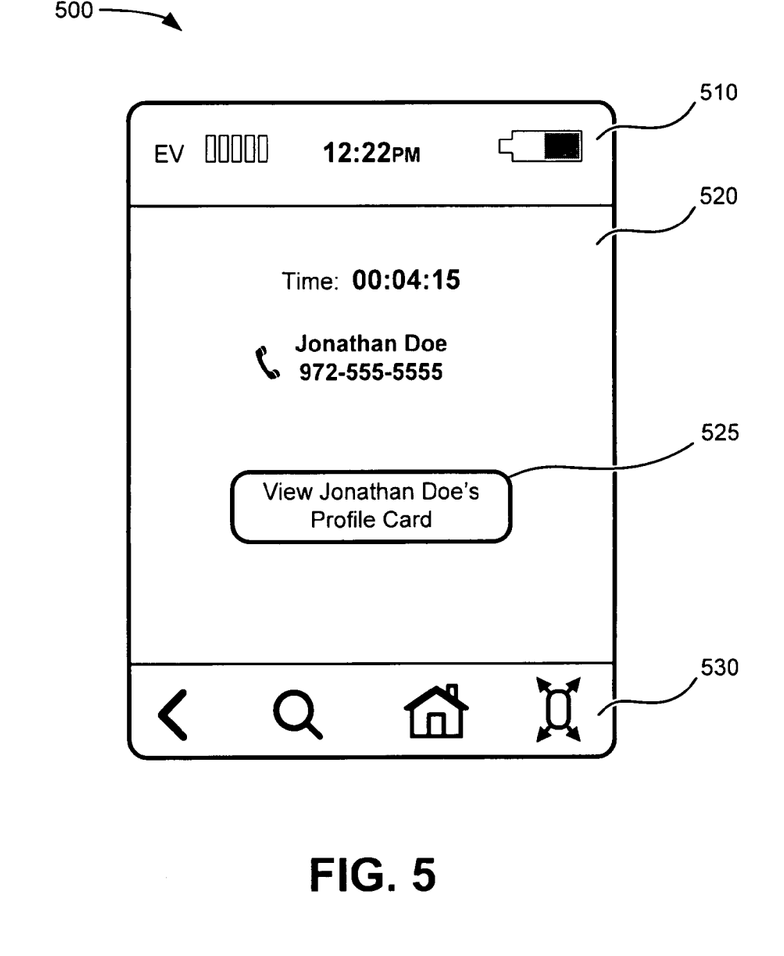
FIG. 5 provides an example of a telephone call screen according to implementations described herein.

FIG. 5 provides an example of a telephone call screen 500 according to implementations described herein. Telephone call screen 500 may be displayed, for example, on a display (e.g., display 230) of device 200 during an ongoing telephone call. As shown in FIG. 5, telephone call screen 500 may include a device information section 510, a call information section 520, and a screen navigation section 530. Call information section may include a profile card link 525. Device information section 510 may include general information relating to device 200, such as signal strength, available network(s), battery life, etc.

Call information section 520 may include information regarding an ongoing telephone call, such as the elapsed time, the telephone number (e.g., mobile directory number or another other number) of the other party, a contact indicator for the other party, etc. Call information section 520 may also include profile card link 525 to allow a user of device 200 to open an interactive profile card for the contact identified in call information section 520. In an exemplary implementation, profile card link 525 may be selected by a user of device 200 (e.g., by a touch on touch-sensitive display 230) to display the interactive profile card (e.g., interactive profile card 100) while the call session remains active.

Screen navigation section 530 may include one or more icons to allow a user to navigate through other applications on device 200. For example, in one implementation, screen navigation section 530 may include an icon to directly or indirectly access an interactive profile card. In an exemplary implementation, a user may use screen navigation section to identify a particular contact from a user's list of contacts (e.g., stored in memory 310) and request an interactive profile card 100 for the particular contact.

Figure 6A:
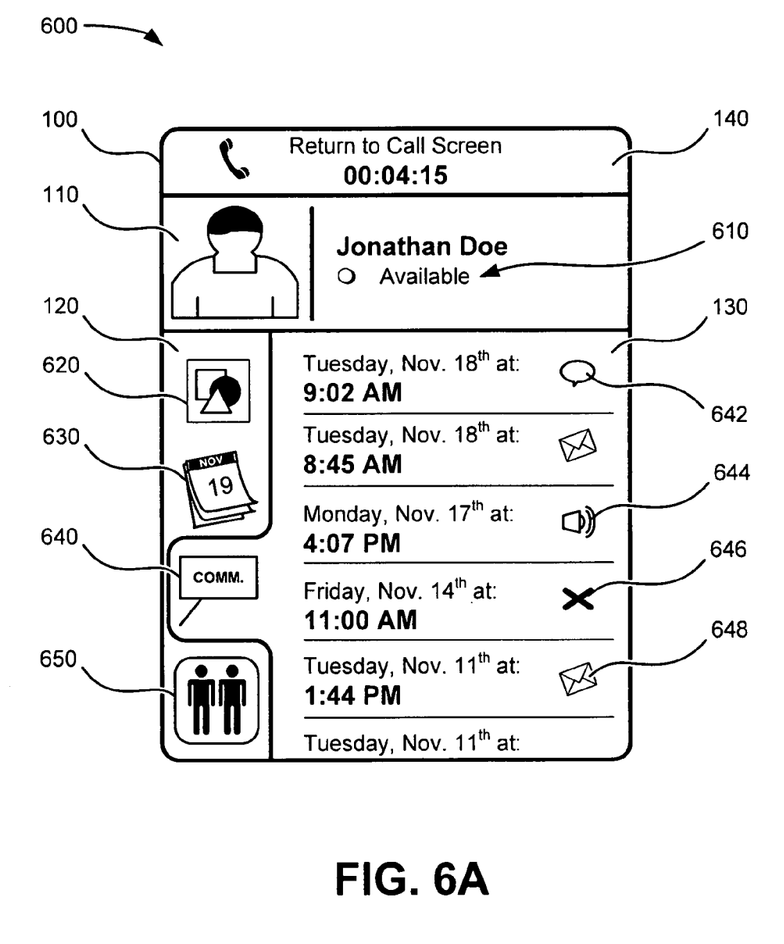
FIGS. 6A and 6B provide diagrams of exemplary interactive profile card operations capable of being performed by the device of FIG. 2.
Figure 6B:
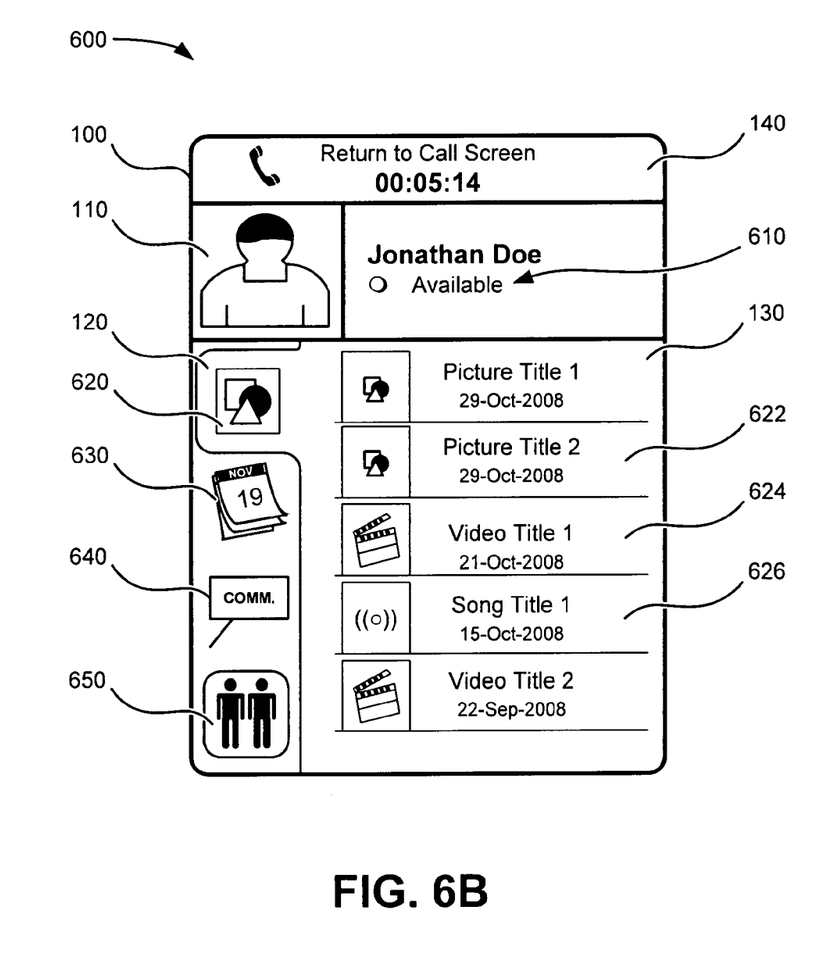

FIGS. 6A and 6B illustrate diagrams of exemplary interactive profile card operations 600 capable of being performed by device 200. In one implementation, the operations described in connection with FIGS. 6A and 6B may be performed by processor 200 (FIG. 2). Interactive profile card 100 may include contact indicator section 110, contact-related category section 120, contact-related item section 130, and navigation section 140. Contact indicator section 110, contact-related category section 120, contact-related item section 130, and navigation section 140 may include the features described above in connection with FIG. 1.

In the example of FIGS. 6A and 6B, interactive profile card 100 may be displayed in response to a user of device 200 having selected profile card link 525 (FIG. 5) during an ongoing call with "Jonathan Doe." Thus, interactive profile card 100 may include information that is specific to Jonathan Doe. Along with a name and image of the contact, profile card 100 may include, in contact indicator section 110, a presence indication (e.g., "Available") for the Jonathan Doe.

Contact-related category section 120 may include icons for groups of similar information and/or applications related to Jonathan Doe. As shown in FIGS. 6A and 6B, contact-related category section 120 may include an icon 620 for multimedia-related items, an icon 630 for scheduling items, an icon 640 for communications items, and an icon 650 for social networking-related items. Each of icons 620, 630, 640, and 650 may be associated with a different window (e.g., in contact-related item section 130) that may include particular items associated with each of icons 620, 630, 640, and 650.

In one implementation (as shown in FIGS. 6A and 6B), the windows associated with icons 620, 630, 640, and 650 may be displayed in a tabbed format so that the windows associated with icons 620, 630, 640, and 650 may appear to overlap each other. For example, icon 620 may be associated with media items, such as pictures, videos, music, or podcasts associated with the contact; icon 630 may be associated with schedule items such as events on a calendar or task list; icon 640 may be associated with communications items, such as text messages, emails, voicemails, missed calls, etc.; and icon 650 may be associated with a social networking website or links to one or more social networking websites. Other icons for groups of applications (not shown) may include Really Simple Syndication (RSS) feeds, GPS searches, or other information. In another implementation, each icon in contact-related category section 120 may be associated with a single application, such as an email application, a text-messaging application, a telephone application, an image-viewing application, a video-application, a music application, etc.

A user of device 200 may select a type of contact-related items to display in contact-related item section 130 by selecting an icon from contact-related category section 120. Referring to FIG. 6A, particular items associated with communications may be displayed in contact-related item section 130 when a user selects (e.g., via a touch on a touch-sensitive display) icon 640 for communications items. Particular items may include, for example, a text message indicator 642, a voicemail indicator 644, a missed call indicator 646, and an email indicator 648.

Text message indicator 642 may include information relating to a text message received from or sent to the contact (i.e., Jonathan Doe), such as a date/time (e.g., "Tuesday, November $18^{th}$ at: 9:02 AM") when the text message was sent/received by device 200, an icon symbolizing a text message, and/or other information related to the text message. In one exemplary implementation, although not shown in FIG. 6A, text message indicator 642 may include some or all of the information associated with the text message (e.g., text contained in the referenced text message, indication of an attachment, etc.). In one implementation, by selecting (e.g., via a touch on a touch-sensitive display) text message indicator 642, a user may cause device 200 to open a text messaging application and/or to display the text message associated with text message indicator 642.

Voicemail indicator 644 may include information relating to a voicemail received from the contact (i.e., Jonathan Doe), such as a date/time (e.g., "Monday, November $17^{th}$ at: 4:07 PM") when the voicemail was received by device 200, an icon symbolizing a voicemail, and/or other information related to the voicemail. In one exemplary implementation, although not shown in FIG. 6A, voicemail indicator 644 may include some or all of the call information (e.g., a phone number as associated with Jonathan Doe, a duration of the voicemail, etc.) associated with the voicemail. In one implementation, by selecting (e.g., via a touch on a touch-sensitive display) voicemail indicator 644, a user may cause device 200 to open a voicemail application and/or to play the voicemail message associated with voicemail indicator 644.

Missed call indicator 646 may include information relating to an unanswered call received from the contact (i.e., Jonathan Doe), such as a date/time (e.g., "Friday, November $14^{th}$ at: 11:00 AM") when the call was received by device 200, an icon symbolizing a missed call, and/or other information related to the missed call. In one exemplary implementation, although not shown in FIG. 6A, missed call indicator 646 may include some or all of the call information (e.g., a phone number as associated with Jonathan Doe, etc.) associated with missed call 530. In one implementation, by selecting (e.g., via a touch on a touch-sensitive display) missed call indicator 646, a user may cause device 200 to open a phone application and/or to display the missed call information associated with missed call indicator 646.

Email indicator 648 may include information relating to an email sent to or received from the contact (i.e., Jonathan Doe), such as a date/time (e.g., "Tuesday, November $11^{th}$ at: 1:44 PM") when the text message was sent/received by device 200, an icon symbolizing an email, and/or other information related to the email. In one exemplary implementation, although not shown in FIG. 6A, email indicator 648 may include some or all of the information associated with the email (e.g., text contained in the referenced email, indication of an attachment, etc.). In one implementation, by selecting (e.g., via a touch on a touch-sensitive display) email indicator

648, a user may cause device 200 to open an email application and/or to display the email associated with email indicator 648.

Referring to FIG. 6B, a user of device 200 may select a group of multimedia items to display in contact-related item section 130 by selecting icon 620 from contact-related category section 120. Particular items associated with icon 620 for multimedia-related items may be displayed in contact-related item section 130. Particular items associated with icon 620 may be identified, for example, from the contact's profile and/or from associations made by the user of device 200. Particular items may include, for example, an image indicator 622, a video indicator 624, and an audio indicator 626.

Image indicator 622 may include information relating to an image available from the contact (i.e., Jonathan Doe). Exemplary information in image indicator 622 may include an icon indicating an image file (in contrast with a video or audio file, for example), a name or title of the image (e.g., "Picture Title 2"), a date/time (e.g., "29 Oct. 2008") when the image was saved/created, and/or other information related to the image. In one exemplary implementation, although not shown in FIG. 6A, image indicator 622 may include a "thumbnail" view of the image. In one implementation, by selecting (e.g., via a touch on a touch-sensitive display) image indicator 622, a user may cause device 200 to open an image viewing application and/or to display the image associated with image indicator 622.

Video indicator 624 may include information relating to a video available from the contact (i.e., Jonathan Doe). Exemplary information in video indicator 624 may include an icon indicating a video file (in contrast with an image or audio file, for example), a name or title of the video (e.g., "Video Title 1"), a date/time (e.g., "21 Oct. 2008") when the video was saved/created, and/or other information related to the video. In one exemplary implementation, although not shown in FIG. 6A, video indicator 624 may include a "thumbnail" view of a frame of the video, artist information, or a description of the video (as provided, for example, by creator of the video). In one implementation, by selecting (e.g., via a touch on a touch-sensitive display) video indicator 624, a user may cause device 200 to open a video application and/or to play the video call information associated with video indicator 624.

Audio indicator 626 may include information relating to an audio file available from the contact (i.e., Jonathan Doe). Exemplary information in audio indicator 626 may include an icon indicating an audio file (in contrast with a video or image file, for example), a name or title of the audio file (e.g., "Song Title 1"), a date/time (e.g., "15 Oct. 2008") when the audio file was saved/created, and/or other information related to the audio file. In one exemplary implementation, although not shown in FIG. 6A, audio indicator 626 may include artist information, a music genre, or other descriptive information about the audio file. In one implementation, by selecting (e.g., via a touch on a touch-sensitive display) audio indicator 626, a user may cause device 200 to open an audio application and/or to play the audio file associated with audio indicator 626.

Although FIGS. 6A and 6B show exemplary interactive profile card operations 600 associated with device 200, in other implementations, device 200 may perform fewer, different, or additional operations than depicted in FIGS. 6A and 6B.

Figure 7:
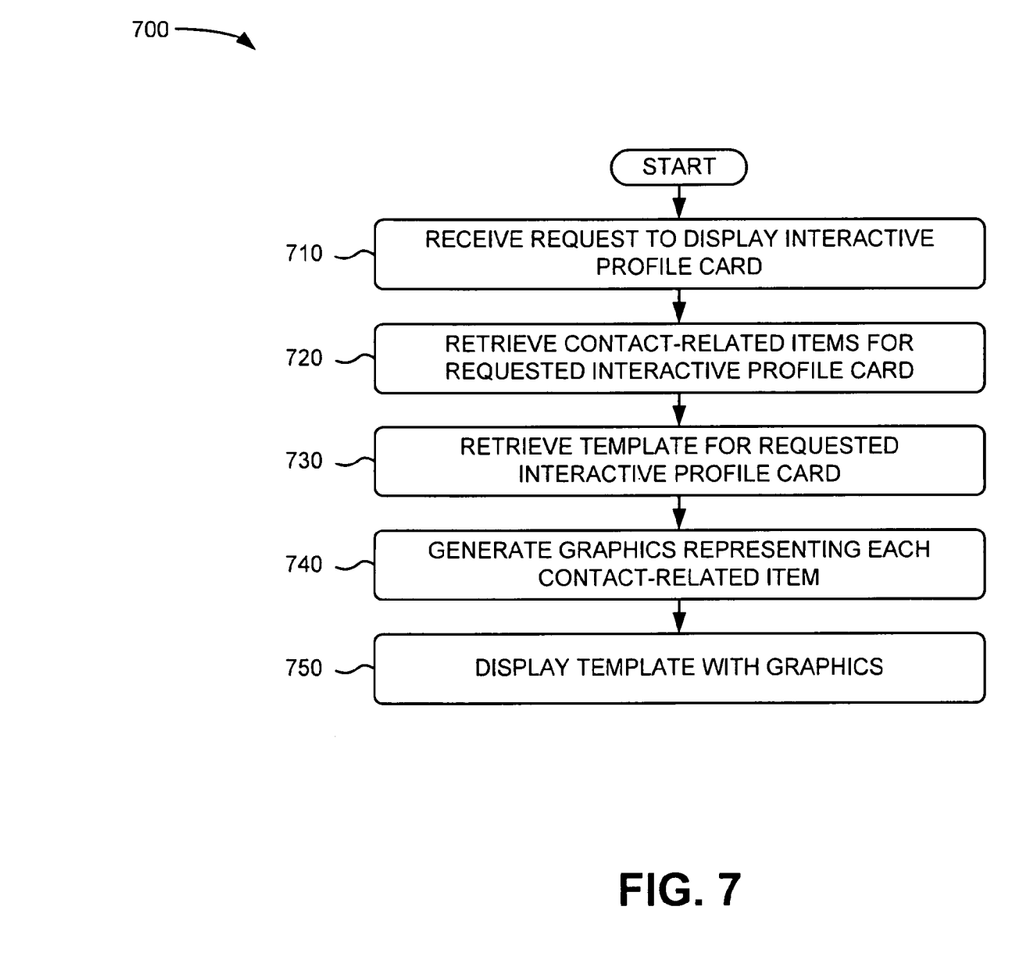
FIGS. 7-8 depict a flow chart of an exemplary process for assembling an interactive profile card according to implementations described herein.

FIG. 7 depicts a flow chart of an exemplary process 700 for using an interactive profile card according to implementations described herein. In one implementation, process 700 may be performed by device 200. In another implementation, some or all of process 700 may be performed by another device or group of devices, including or excluding device 200.

As illustrated in FIG. 7, process 700 may begin with receiving a request to display an interactive profile card (block 710). For example, device 200 (e.g., profile card controller 410) may receive a request initiated by a user to display an interactive profile card (e.g., interactive profile card 100). In one implementation, as described in FIG. 5, the request to display a profile card may be initiated by a user in response to a prompt on a call screen (e.g., profile card link 525 on telephone call screen 500). In another implementation, the request to display a profile card may be initiated by a user through another selection process, such as a selection from a list of contacts in a directory.

Contact-related items for the requested interactive profile card may be retrieved (block 720). For example, device 200 may retrieve contact-related items from the particular contact's stored profile and/or from other sources.

Figure 8:
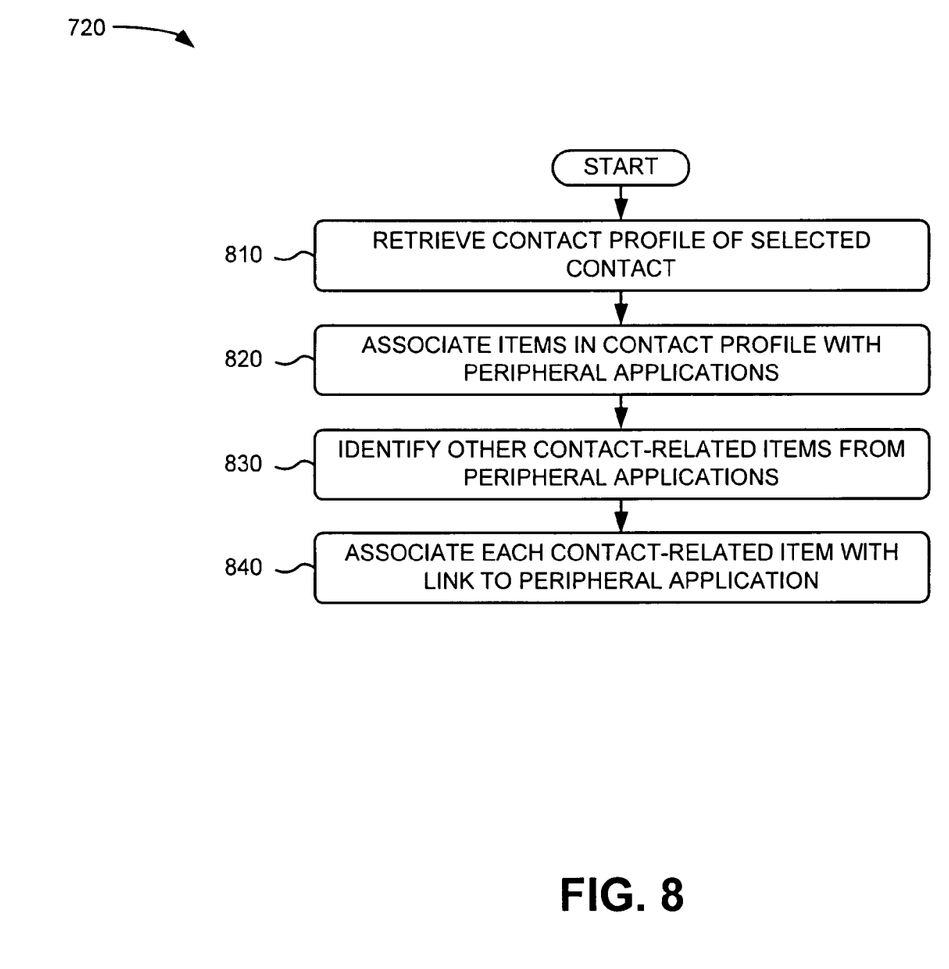

Process block 720 may include the process blocks illustrated in FIG. 8. As shown in FIG. 8, process block 720 may begin with retrieving a contact profile of the selected contact (block 810). For example, device 200 (e.g., profile card controller 410) may retrieve a contact profile for the particular contact that is the subject of the user's profile card request. The contact profile may be retrieved, for example, from a service provider that stores and provides contact profile services for subscribers. The contact profile may have different levels of access, such that only users with rights granted by a contact may access some or all of the contact profile. The contact profile may include information configured for multiple kinds of applications, such as images, videos, GPS, web sites, etc.

The items in the contact profile may be associated with peripheral applications (block 820). For example, device 200 may identify default applications associated with files or other items included in the contact profile. In an exemplary implementation, device 200 may associate an image, such as a joint photographic experts group (jpeg) format image, with a particular image viewing application.

Other contact-related items may be identified from peripheral applications (block 840). For example, device 200 may identify items related to the contact from applications stored within a memory (e.g., memory 310) of device 200. For example, device 200 may identify email items, schedule information, stored images, or other information stored within device 200 that may be associated with a particular contact.

Each contact-related item may be associated with a link to a peripheral application (block 840). For example, based on the type of contact-related item, device 200 may associate each contact-related item with a link to a peripheral application that is suitable to present the contract-related item to the user.

Returning to FIG. 7, a template for the requested interactive profile card may be retrieved (block 730). For example, device 200 may retrieve a template for the interactive profile card that corresponds to the contact. In one implementation, a single template may be applied to all contacts. In another implementation, different templates may be used for different types (or categories) of contacts. For example, device 200 may include a template for business contacts and a different template for personal contacts, where contacts may designated as a business or personal contact based on a user preference.

Graphics representing each contact-related item may be generated (block 740). For example, device 200 generate a graphic to represent each contact related item associated with the particular contact that is the subject of the interactive profile card request. As described in FIGS. 6A and 6B, the graphics may be presented as indicators (e.g., indicators 622, 624, 626, 642, 644, 646, and 648) and may be grouped according to categories (e.g., media items, schedule items, communications items, or social networking). In another implementation, the indicators may be grouped based on the type of peripheral application needed to view the item that is related to the particular contact.

The template with the contact-specific items may be displayed (block 750). For example, device 200 may display the template and indicators for items that are related to the particular contact. In one implementation, as described in FIGS. 6A and 6B, groups of indicators may be displayed based on the icon (e.g., icon 620, 630, 640, or 650) selected by the user for a particular category.

Figure 9:
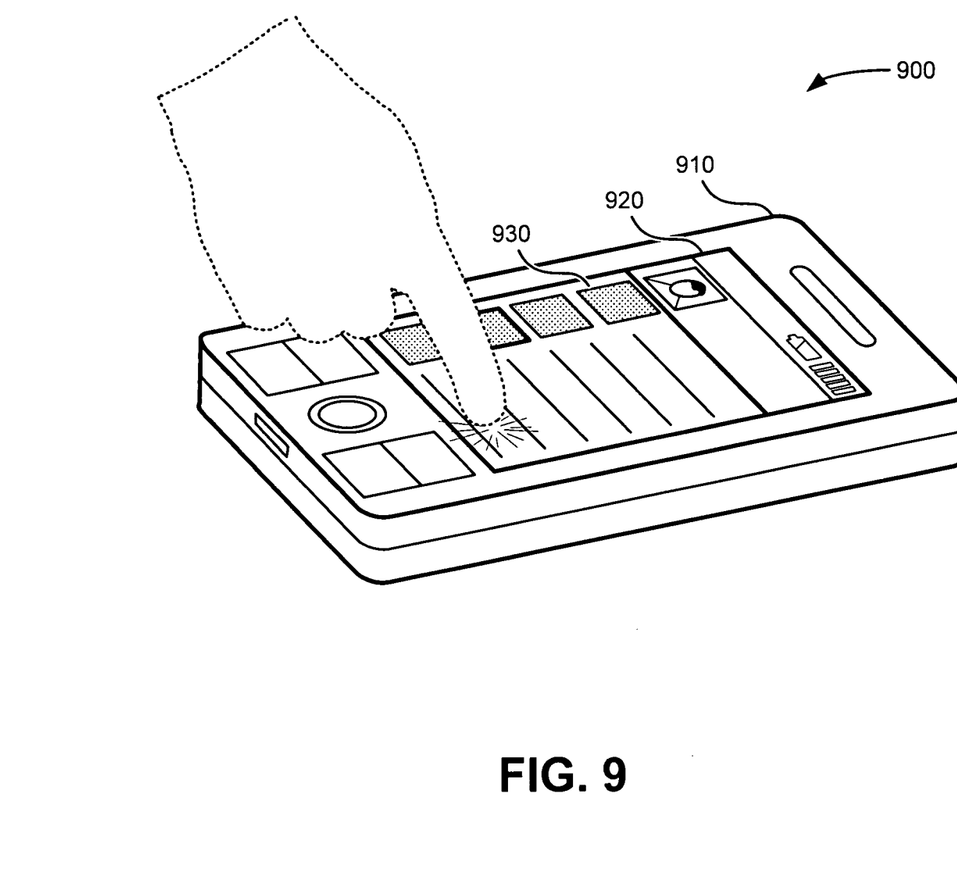
FIG. 9 provides an illustration of an exemplary implementation of an interactive profile card on a mobile device.

FIG. 9 provides an illustration of an exemplary implementation of an interactive profile card on a device 900. Device 900 may include housing 910 and a touch-sensitive display 920. Other components, such as control buttons, a keypad, a microphone, a camera, connectivity ports, memory slots, and/or speakers may be located on device 900, including, for example, on a rear or side panel of housing 910.

Device 900 may present on display 920 a graphical user interface that includes an interactive profile card 930 to provide an indication of contact-related items. Each contact-related item may include a link to a related peripheral application associated with the contact-related item. As shown in FIG. 9, user input in the form of a touch on touch-sensitive display 920 may provide a signal to device 900 to open and/or display the peripheral application associated with the contact-related item selected by the user. In other implementations, user input may be provided in a form other than a touch on an touch-sensitive display, such as manipulation of a mouse or touch pad guiding a cursor, use of a control button, and/or dedicated navigation keys.

Systems and/or methods described herein may receive a request to display an interactive profile card for a particular contact. The request may be prompted during an ongoing telephone call. In response to the request, contact-related items for the particular contact may be retrieved. A template for the interactive profile card may also be retrieved and graphics may be generated to represent the contact-related items. The template with the graphic may be displayed to the user. When the graphic is selected by the user, a peripheral application may be opened to present the contact-related item.

The foregoing description of implementations provides illustration and description, but is not intended to be exhaustive or to limit the invention to the precise form disclosed. Modifications and variations are possible in light of the above teachings or may be acquired from practice of the invention.

For example, while implementations herein have been described primarily in the context of a mobile device (such as a radiotelephone, a PCS terminal, or a PDA), in other implementations the systems and/or methods described herein ma be implemented on other computing devices such as a laptop computer, a personal computer, a tablet computer, an ultra-mobile personal computer, or a home gaming system.

Also, while series of blocks have been described with regard to FIGS. 7 and 8, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device, a request to display an interactive profile card for a particular contact;
   retrieving, by the computing device, one or more contact-related items associated with the interactive profile card, the one or more contact-related items being provided by the particular contact;
   associating, by the computing device, the one or more contact-related items with a particular peripheral application, of a plurality of peripheral applications associated with the computing device;
   identifying, by the computing device, one or more other contact-related items associated with the particular peripheral application,
   the one or more other contact-related items being provided by a user of the computing device;
   presenting, by the computing device and based on receiving the request, the interactive profile card,
   the interactive profile card including a plurality of categories,
      each category, of the plurality of categories, including one of the one or more contact-related items associated with the particular contact;
   receiving, by the computing device, a selection of a category of the plurality of categories;
   retrieving, by the computing device and based on the selection, a plurality of items, associated with the selected category, for the particular contact,
      the plurality of items including:
         at least one of the one or more contact-related items provided by the particular contact and at least one of the one or more other contact-related items provided by the user;
   generating, by the computing device, a plurality of graphics representing the plurality of items;
   displaying, on a display of the computing device, the plurality of graphics;
   receiving, by the computing device, a selection of a graphic of the plurality of graphics,
      the graphic being associated with an item of the plurality of items; and executing, by the computing device and based on receiving the selection of the graphic, the particular peripheral application to present the item for display to the user.

2. The method of claim 1, further comprising:
associating the graphic with a link to the particular peripheral application.

3. The method of claim 1, where the one or more contact-related items provided by the particular contact is retrieved from a server of a service provider.

4. The method of claim 3, where the one or more contact-related items are included in a contact profile of the particular contact that is stored on the server and is managed by the particular contact.

5. The method of claim 1, where the graphic includes:
a time indicator,
an item indicator, or
a peripheral application identifier.

6. The method of claim 1, where the particular peripheral application includes:
a telephone application,
a text-messaging application,
an email application,
an instant messaging (IM) application,
a calendar application,
a multimedia messaging service (MMS) application,
a short message service (SMS) application,
a navigation application, or
a social networking service.

7. The method of claim 1, where the computing device comprises one or more of:
a radiotelephone,
a personal communications system (PCS) terminal, or
a personal digital assistant (PDA).

8. The method of claim 1, where the request to display the interactive profile card is generated during a phone call on the computing device.

9. The method of claim 1, where the computing device comprises one or more of:
a laptop computer,
a personal computer,
a tablet computer,
an ultra-mobile personal computer,
a personal gaming system, or
a global positioning system (GPS) unit.

10. The method of claim 1, further comprising:
prompting the user, during a telephone call, to request the interactive profile card for the particular contact; and
where retrieving the one or more contact-related items includes:
retrieving the one or more contact-related items during the telephone call.

11. A device comprising:
a memory to store a plurality of instructions; and
a processor to execute instructions in the memory to:
receive a request to display an interactive profile card for a particular contact;
retrieve a plurality of contact-related items, associated with a selected contact-related category, of a plurality of contact-related categories, for the particular contact,
the plurality of contact-related items being provided by the particular contact;
associate each contact-related item, of the plurality of contact-related items, with a corresponding peripheral application of a plurality of peripheral applications;
identify one or more other contact-related items associated with each peripheral application of the plurality of peripheral applications,
the one or more other contact related items associated with each peripheral application being provided by a user of the device;
retrieve a template for the interactive profile card,
the template including indications of the plurality of contact-related categories, the one or more other contact-related items associated with each peripheral application, and the plurality of contact-related items;
generate a plurality of graphics representing the plurality of contact-related items and the one or more other contact-related items associated with each peripheral application;
display, based on the template, the interactive profile card including plurality of graphics;
receive a selection of a graphic of the plurality of graphics,
the graphic being associated with a contact-related item of the plurality of contact-related items or a contact-related item of the one or more other contact-related items associated with each peripheral application; and
execute, based on receiving the selection of the graphic, a peripheral application, of the plurality of peripheral applications, to present the contact-related item of the plurality of contact-related items or the contact-related item of the one or more other contact-related items to the user.

12. The device of claim 11, where the peripheral application includes:
a telephone application,
a text-messaging application,
an email application,
an instant messaging (IM) application,
a calendar application,
an image viewing application,
a video application,
an audio application,
a multimedia messaging service (MMS) application,
a short message service (SMS) application,
a navigation application, or
a social networking service.

13. The device of claim 11, where, when retrieving the plurality of contact-related items for the particular contact, the processor is further to execute the instructions in the memory to:
retrieve a contact profile of the particular contact,
the contact profile including the plurality of contact-related items, and
the plurality of contact-related items, included in the contact profile, including one or more of:
an image file provided by the particular contact,
a video file provided by the particular contact, or
an audio file provided by the particular contact.

14. The device of claim 13, where the contact profile of the particular contact is retrieved from a server of a service provider.

15. The device of claim 13, where the contact profile of the particular contact is managed by the particular contact.

16. The device of claim 11, where the processor further executes instructions in the memory to:
associate the graphic with a link to the peripheral application.

17. The device of claim 11, where the processor further executes instruction in the memory to:
    prompt the user, during the telephone call, to request the contact-related items associated with the particular contact.

18. The device of claim 11, where the device comprises one or more of:
    a radiotelephone,
    a personal communications system (PCS) terminal,
    a personal digital assistant (PDA),
    a laptop computer,
    a personal computer,
    a tablet computer,
    an ultra-mobile personal computer,
    a gaming system, or
    a global positioning system (GPS) unit.

19. A device comprising:
    one or more processors to:
        receive, during a telephone call, a request to display an interactive profile card for a particular contact;
        retrieve, from a remote server, a profile for the particular contact,
            the profile including contact-related items provided by the particular contact;
        associate each contact-related item, of the contact-related items, with a corresponding peripheral application of a plurality of peripheral applications;
        identify one or more other contact-related items associated with each peripheral application of the plurality of peripheral applications;
        display, on a display of the device, the interactive profile card,
            the interactive profile card including:
                a plurality of contact-related categories associated with the plurality of peripheral applications and the particular contact;
                graphics associated with one or more of the contact-related items provided by the particular contact and associated with a particular contact-related category of the plurality of contact-related categories, and
                graphics associated with the one or more other contact-related items identified as being associated with a peripheral application, of the plurality of peripheral applications, associated with the particular contact-related category; and
        execute the peripheral application to:
            present a particular contact-related item, of the one or more contact-related items provided by the particular contact, when a graphic of the graphics associated with the one or more contact-related items is selected by the user,
                the graphic being associated with the particular contact related item, and
            present a particular other contact-related item, of the one or more other contact-related items identified as being associated with the peripheral application, when a graphic of the graphics associated with the one or more other contact-related items identified as being associated with the peripheral application is selected by the user.

20. The device of claim 19, where the one or more processors are further to:
    identify a type of peripheral application associated with each contact-related item, of the contact-related items, and
    where, when associating each contact related item, of the contact-related items, with the corresponding peripheral application, the one or more processors are to:
        associate each contact-related item, of the contact-related items, with the corresponding peripheral application based on the type of peripheral application associated with each contact-related item.

21. The device of claim 19, where the one or more processors are further to:
    prompt the user, during the telephone call, to request the interactive profile card for the particular contact.

\* \* \* \* \*